United States Patent
Dammen et al.

(10) Patent No.: US 9,927,314 B2
(45) Date of Patent: Mar. 27, 2018

(54) PRESSURE SENSOR COMPRISING A HERMETIC CASING

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Egil Dammen, Horten (NO); Endre Korsvold, Horten (NO); Frédéric Marques, Clermont-Ferrand (FR); Mark Leman, Matfield (GB)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 307 days.

(21) Appl. No.: 14/650,964

(22) PCT Filed: Dec. 20, 2013

(86) PCT No.: PCT/FR2013/053239
§ 371 (c)(1),
(2) Date: Jun. 10, 2015

(87) PCT Pub. No.: WO2014/096744
PCT Pub. Date: Jun. 26, 2014

(65) Prior Publication Data
US 2016/0025585 A1    Jan. 28, 2016

(30) Foreign Application Priority Data
Dec. 21, 2012  (FR) .................................... 12 62574

(51) Int. Cl.
*G01L 19/00*  (2006.01)
*G01L 19/06*  (2006.01)
(Continued)

(52) U.S. Cl.
CPC .......... *G01L 19/0645* (2013.01); *B60C 23/04* (2013.01); *G01L 9/008* (2013.01); *G01L 19/147* (2013.01)

(58) Field of Classification Search
None
See application file for complete search history.

(56) References Cited

U.S. PATENT DOCUMENTS 4,686,764 A * 8/1987 Adams ................ G01L 19/0645
156/303.1
4,928,376 A   5/1990 Poglitsch ........................ 29/530
(Continued)

FOREIGN PATENT DOCUMENTS

DE   20 2009 013 919 U1   7/2010
EP       2 423 656 A1     2/2012
(Continued)

OTHER PUBLICATIONS

Written Opinion of the International Searching Authority (English translation), issued by WIPO in connection with International Application No. PCT/FR2013/053239.

*Primary Examiner* — Jill Culler
(74) *Attorney, Agent, or Firm* — Fitzpatrick, Cella, Harper & Scinto

(57) ABSTRACT

A pressure sensor includes an encapsulant housing an electronic member. The electronic member includes a proof body, which has two opposite sides facing away from each other. On a first side of the proof body is a reference-pressure chamber. On a second side of the proof body facing away from the first side is a pressure-to-be-measured chamber in communication with outside of the encapsulant. Delimited between the electronic member and the encapsulant is a housing for gel. An orifice enables the housing for gel to be in communication with outside of the encapsulant.

8 Claims, 1 Drawing Sheet

(51) Int. Cl.
*G01L 19/14* (2006.01)
*B60C 23/04* (2006.01)
*G01L 9/00* (2006.01)

(56) References Cited

U.S. PATENT DOCUMENTS

| | | | | |
|---|---|---|---|---|
| 6,229,190 | B1 * | 5/2001 | Bryzek | G01L 9/0042 257/254 |
| 6,350,630 | B1 * | 2/2002 | Wildgen | G01L 19/147 257/680 |
| 6,521,966 | B1 * | 2/2003 | Ishio | G01L 19/147 257/417 |
| 6,559,379 | B2 * | 5/2003 | Solanki | G01L 19/0084 174/533 |
| 6,732,590 | B1 * | 5/2004 | Gottlieb | G01L 19/147 73/754 |
| 6,747,346 | B2 * | 6/2004 | Saito | G01L 19/142 257/678 |
| 7,004,033 | B2 * | 2/2006 | Katayama | G01L 19/143 73/706 |
| 7,036,380 | B2 * | 5/2006 | Fessele | G01L 19/0645 73/706 |
| 7,225,678 | B2 * | 6/2007 | Kandler | G01L 19/0645 73/715 |
| 2002/0029639 | A1 * | 3/2002 | Wagner | G01L 9/0042 73/756 |
| 2008/0223143 | A1 | 9/2008 | Murari et al. | 73/727 |
| 2009/0203163 | A1 | 8/2009 | Eriksen et al. | 438/51 |
| 2010/0199777 | A1 | 8/2010 | Hooper et al. | 73/721 |
| 2011/0088480 | A1 | 4/2011 | Koehler et al. | 73/753 |
| 2012/0042734 | A1 * | 2/2012 | Wade | G01L 9/0052 73/862.381 |
| 2012/0239313 | A1 | 9/2012 | Champredonde et al. | 702/50 |

FOREIGN PATENT DOCUMENTS

| | | |
|---|---|---|
| FR | 2 754 342 A1 | 4/1998 |
| FR | 2 783 048 A1 | 3/2000 |
| FR | 2 950 691 A1 | 4/2011 |

* cited by examiner

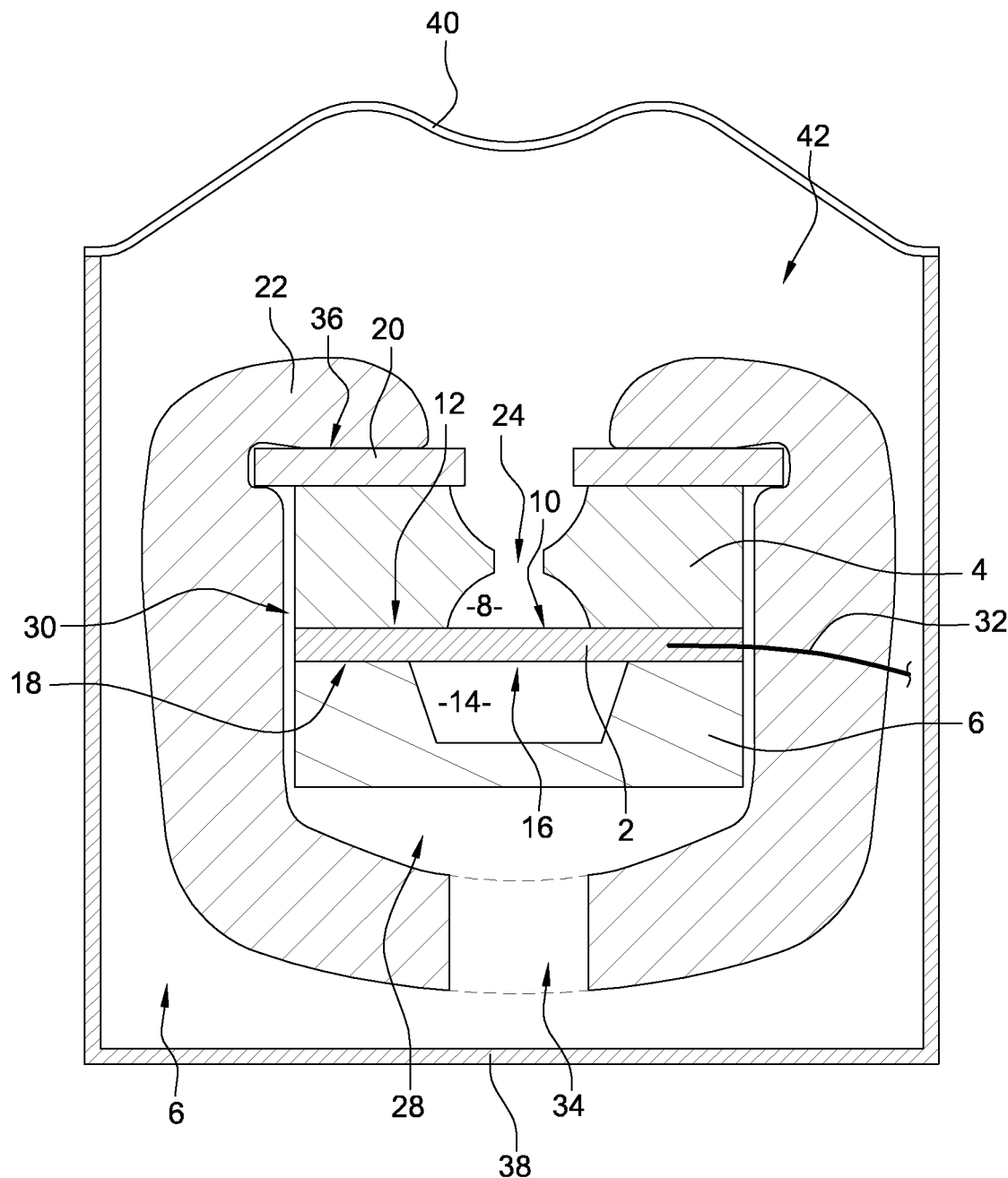

PRESSURE SENSOR COMPRISING A HERMETIC CASING

FIELD OF THE INVENTION

The present invention relates to the technical field of pressure sensors, particularly, although not exclusively, sensors for measuring tyre pressure, for example for a construction plant vehicle tyre. It may also be used in other fields, notably for measuring pressure in a corrosive environment, or in a liquid.

RELATED ART

French patent application FR 0956796 already proposes to produce a pressure sensor using an electronic component arranged inside a fluidtight casing filled with a liquid or a gel, this fluidtight casing typically comprising a deformable membrane sensitive to the external pressure and therefore able to transmit this external pressure to the proof body via this liquid or this gel. Such a fluid, which is more or less incompressible, in fact faithfully relays the external pressure and may advantageously be chosen from liquids and/or gels that are not corrosive towards the various elements of the electronic component.

One essential element of the electronic component is the deformable proof body on which the pressure that is to be measured is applied. This body typically comprises an element of the strain gauge type, capable of converting the deformation resulting from the pressure into an electrical signal intended for means of processing this signal. As an alternative, the proof body comprises an element of the piezoelectric type.

Most often, the proof body is made of monocrystalline silicon and comprises an electric or electronic microcircuit produced on one of its faces by one or more of the technologies of the semiconductor industry (microetching, printed circuit, chemical deposition, etc.).

In general, the key elements of the electronic component, which generally typically comprise the proof body and one or more substrates generally secured to this proof body, form an electronic member that is both very small and relatively fragile which is housed in an encapsulant that protects it and allows it to be handled, for example in a rubber, plastic or resin encapsulant. The electronic component formed of the electronic member thus encapsulated can thus be handled without the risk of damage.

The encapsulant comprises a passage providing fluidic access to a proof surface, on one of the faces of the proof body: the proof face. The other face, or reference face, typically comprises a reference surface partially delimiting a fluidtight reference-pressure chamber in which a reference pressure can be created. Use is generally made of a chamber containing a partial vacuum such that the reference pressure varies very little with the temperature of the sensor.

The space contained between the electronic member and the encapsulant forms a housing that is typically filled with a gel at the moment of encapsulation of the electronic member. This gel performs at least one, and sometimes two, functions:

Firstly, it makes it easier for the encapsulant to be applied, reducing the risks of mechanical damage to the elements of the electronic member, which are relatively fragile, at the moment of encapsulation. Secondly, for certain applications, it allows one or more elements of the electronic member which are sensitive to corrosion, for example electrical contacts with one or more electric microcircuits, to be placed in a contained non-corrosive environment.

A sensor as defined hereinabove, comprising an electronic component immersed for example in a non-corrosive liquid, inside a fluidtight casing, may notably be used in a corrosive environment such as that of the tyre industry, because of its use of chemical products used for tyre and rim maintenance.

However, it has been found, during repeated pressure cycles involving significant variations in temperature, for example with temperatures ranging up to 60° and beyond, that after several cycles the sensor can yield inaccurate pressure data.

BRIEF DESCRIPTION OF EMBODIMENTS OF THE INVENTION

It is a particular object of the invention to solve the problems of pressure sensor reliability in repeated operating cycles involving wide temperature ranges.

To this end, one subject of the invention is a pressure sensor comprising an electronic component comprising an electronic member housed in an encapsulant, the electronic member comprising a proof body, a reference-pressure chamber delimited by a reference surface on a reference face of the proof body, a pressure-to-be-measured chamber, communicating with the outside of the encapsulant, delimited by a proof surface on a proof face of the proof body opposite to the reference face, the electronic member and the encapsulant between them delimiting a housing for gel, characterized in that it comprises an orifice placing the housing for gel in communication with the outside of the encapsulant, the sensor being configured so that this communication also allows pressure-equalizing communication to be established between the housing and the pressure-to-be-measured chamber.

Indeed it has been found with surprise that creating such communication between the housing for gel and the outside of the encapsulant, typically with the external liquid, in some way resulting in less rigorous encapsulation of the electronic member, allowed the problems due to thermal cycling to be resolved.

Without being tied to any one particular interpretation, it was thought that high amplitude thermal cycling could probably lead to the ingress of external liquid into the housing reserved for the gel. In a later thermal cycle, that liquid could then find itself trapped by the gel which, because of its high viscosity, could act like a seal. As liquid was prevented from expanding, it is possible that that created local raised pressures applied to the proof body, introducing an error into the measurement of the true pressure of the fluid.

The term "pressure-equalizing communication" may be understood as meaning fluidic communication, and/or communication via a gel, without even partial hermetic sealing that would oppose communication or equalizing of pressures.

For preference, the orifice that places the housing in communication with the outside of the encapsulant is positioned, with respect to the proof body, on the same side as and facing the reference face. Indeed it is in this region furthest away from the pressure-to-be-measured chamber, and which is typically the most confined, that the risks of liquid finding itself trapped are the greatest.

For preference, the orifice for placing the housing in communication with the outside of the encapsulant is arranged so that the reference chamber extends between the proof body and this orifice.

The encapsulant typically surrounds any elementary part of the proof surface over a solid angle of at least 50%, and preferably at least 60% of the maximum solid angle. It is typically in direct contact with an edge of the proof body.

In general, the orifice has a circular cross section with a diameter of between 0.2 and 1.0 mm, for example between 0.3 and 0.8 mm.

It is possible to use one, but also to use several, communicating orifices, the housing for a gel forming a space which, in the absence of such an orifice or orifices, is a confined space. In other words, it is indeed the orifice, or plurality of orifices, that allows pressure-equalizing communication between the housing and the pressure-to-be-measured chamber.

If appropriate, the sensor of the invention comprises a sealed casing in which the electronic component is housed, this casing comprising a deformable membrane that can be deformed under the effect of the pressure to be measured, and being filled with an incompressible fluid, for example a liquid or a gel, in which the electronic component is immersed.

Such a sensor can be used in a highly corrosive environment because the elements of the electronic member are not in contact with the corrosive environment, but with an interposed liquid or gel which is typically chosen from liquids or gels that are not corrosive towards the various elements of the electronic member. For example, use may be made of a hydrocarbon paraffinic or naphthenic oil, which is chemically neutral.

The invention also relates to a tyre comprising a pressure sensor for measuring its internal pressure, this sensor being as defined above.

The invention finally also relates to the use of a sensor as defined hereinabove to measure the pressure of a liquid and, in particular, to the use of a sensor comprising an electronic member housed in an encapsulant immersed in the liquid the pressure of which is to be measured.

BRIEF DESCPRIPTION OF THE DRAWINGS

The invention will be better understood from studying the attached single FIGURE which is given by way of example and is entirely nonlimiting, schematically depicting a pressure sensor according to the invention comprising an electronic member housed in an encapsulant, thus forming an electronic component, this electronic component being immersed in a liquid filling a fluidtight external casing.

DETAILED DESCRIPTION OF EMBODIMENTS OF THE INVENTION

Reference is now made to FIG. 1 which notably depicts a proof body 2, arranged between two structural elements or substrates 4 and 6, for example made of glass. The upper face 12 of the proof body 2, or proof face 12, comprises a proof surface 10, in the region of a pressure chamber 8 accessible to a surrounding liquid filling the space 42, via an orifice 24.

The opposite face of the proof body to the proof face is a reference face 18 comprising a reference surface 16 in the region of a fluidtight reference-pressure chamber 14 arranged facing the pressure-to-be-measured chamber 8. The reference-pressure chamber typically contains a gas under partial or even strong vacuum. This vacuum may be maintained, the structural element 6 being mounted in an airtight manner with respect to the proof body 2, in a peripheral zone around the reference-pressure chamber 14.

Because of this partial vacuum, the pressure of the residual gas in the reference-pressure chamber 14 alters only very little as the sensor temperature increases. Thus, when the pressure to be measured in the pressure-to-be-measured chamber 8 changes, the opposing pressure on the reference surface 16 facing the pressure-to-be-measured chamber 8 remains substantially constant, making it possible to link the deformation of the proof body 2 to the pressure in the pressure-to-be-measured chamber 8.

The structural element 4 is likewise mounted in an airtight manner firstly with respect to the proof body 2, around the pressure chamber 8, and secondly with respect to a metal support element 20.

The proof body 2 also comprises a microcircuit, typically an electronic microcircuit, which has not been depicted in the figure, connected to external means, not depicted, for processing a signal correlated with the pressure that is to be measured, this signal being transmitted by transmission means (for example a plurality of electrical connections) indicated schematically by the reference numeral 32.

The assembly formed by the structural elements 4, 6, and 20 and by the proof body 2, with its electronic circuit and its connections, forms an electronic member housed in an encapsulant 22. The housing comprised between the electronic member and the encapsulant 22, formed by the lower volume 28 and the lateral volume 30, is filled with a protective gel at the time of encapsulation of the electronic member. This gel notably makes it possible to limit the mechanical and/or thermal stresses on the electronic member during the encapsulation phase and to avoid damaging it.

The electronic component, formed by the electronic member housed in the encapsulant 22, is immersed in a liquid that fills all of the space 42 between this electronic component and a fluidtight casing 38 comprising a flexible membrane 40 able to relay the external pressure to the liquid filling the space 42 around the electronic component, and also filling the pressure-to-be-measured chamber 8.

When the pressure external to the casing 38 changes, this pressure is relayed automatically to the liquid contained in the space 42, via the membrane 40, the pressure of this liquid also being applied to the proof surface 10 in the pressure-to-be-measured chamber 8. This pressure therefore causes the proof body 2 to deform, and this results in a signal correlated with the pressure applied in the pressure-to-be-measured chamber 8, which signal is transmitted by the transmission means 32 to signal processing means allowing the pressure in the pressure-to-be-measured chamber 8 to be calculated, this pressure being substantially identical to the pressure external to the casing 38.

According to the invention, the sensor comprises an orifice 34 placing the housing 28, 30 for gel in communication with the space 42 outside the encapsulant 22.

It has been possible to note experimentally that such an orifice is able to resolve the malfunctionings of the pressure sensor during repeated cycles involving high amplitude temperature changes. It is believed that during such cycles, liquid from the space 42 can infiltrate into the housing for gel via the upper surface 36 or the lower surface 37 between the upper part of the electronic member, the metal support 20 and the encapsulant 22 and ultimately notably reach the lower volume 28. In the next thermal cycle, this liquid may find itself trapped by the gel which forms a kind of seal. This liquid, enclosed in a determined volume, can then generate a raised pressure by expanding when the temperature increases, particularly in the volume 28. This expansion is liable to deform the electronic member and therefore the proof body 2.

The creation of an orifice 34 makes it possible to avoid such raised pressure as the liquid can leave the housing for gel via this orifice 34.

The invention is not restricted to the embodiment presented and other embodiments will be clearly apparent to those skilled in the art.

The invention claimed is:

1. A pressure sensor comprising:
an encapsulant; and
an electronic member housed in the encapsulant,
wherein the electronic member includes a proof body having a reference face and a proof face, the reference face and the proof face being located on opposite sides of the proof body,
wherein a reference-pressure chamber is delimited by a reference surface on the reference face of the proof body,
wherein a pressure-to-be-measured chamber is delimited by a proof surface on the proof face of the proof body opposite to the reference face, the proof face facing away from the reference face,
wherein the pressure-to-be-measured chamber is in communication with outside of the encapsulant,
wherein delimited between the electronic member and the encapsulant is a housing for gel, the pressure-to-be-measured chamber being outside of the housing for gel, and
wherein the housing for gel is in communication with outside of the encapsulant by an orifice, the orifice enabling a pressure-equalizing communication to be established between the housing for gel and the pressure-to-be-measured chamber.

2. The sensor according to claim 1, wherein the orifice is positioned, with respect to the proof body, to face the reference face on a same side as the reference face.

3. The sensor according to claim 2, wherein the orifice is arranged so that the reference chamber extends between the proof body and the orifice.

4. The sensor according to claim 1, wherein the orifice has a circular cross section with a diameter of between 0.2 mm and 1.0 mm.

5. The sensor according to claim 1, further comprising a sealed casing in which the electronic member and the encapsulant are housed,
wherein the sealed casing includes a deformable membrane, which is deformable by a pressure to be measured, and
wherein the sealed casing is filled with an incompressible fluid in which the electronic member is immersed.

6. The sensor according to claim 5, wherein the incompressible fluid is a liquid or a gel.

7. The sensor according to claim 1, wherein the sensor is incorporated in a tyre to measure an internal pressure of the tyre.

8. A method of measuring pressure comprising steps of:
providing a pressure sensor; and
using the pressure sensor to measure a pressure of a liquid,
wherein the pressure sensor includes:
an encapsulant, and
an electronic member housed in the encapsulant, in which:
the electronic member includes a proof body having a reference face and a proof face, the reference face and the proof face located on opposite sides of the proof body,
a reference-pressure chamber is delimited by a reference surface on the reference face of the proof body,
a pressure-to-be-measured chamber is delimited by a proof surface on the proof face of the proof body opposite to the reference face, the proof face facing away from the reference face,
the pressure-to-be-measured chamber is in communication with outside of the encapsulant,
delimited between the electronic member and the encapsulant is a housing for gel, the pressure-to-be-measured chamber being outside of the housing for gel, and
the housing for gel is in communication with outside of the encapsulant by an orifice, enabling a pressure-equalizing communication to be established between the housing for gel and the pressure-to-be-measured chamber.

* * * * *